United States Patent [19]

Shealy

[11] 3,837,823

[45] Sept. 24, 1974

[54] BUSHING BLOCK ASSEMBLY AND SCREEN

[75] Inventor: Robert G. Shealy, Shelby, N.C.

[73] Assignee: PPG Industries, Inc., Pittsburgh, Pa.

[22] Filed: Dec. 13, 1973

[21] Appl. No.: 424,585

[52] U.S. Cl............................. 65/1, 65/27, 65/172
[51] Int. Cl............................................ C03b 37/02
[58] Field of Search........ 65/1, 172, 27, 11 R, 11 W

[56] References Cited
UNITED STATES PATENTS

| | | | |
|---|---|---|---|
| 1,608,967 | 11/1926 | Tucker et al. | 65/172 |
| 1,796,571 | 3/1931 | Mathieu | 65/172 X |
| 2,692,296 | 10/1954 | Piolenc et al. | 65/1 X |
| 3,573,014 | 3/1971 | Striekland et al. | 65/1 |
| 3,726,655 | 4/1973 | Mitcham et al. | 65/1 |

FOREIGN PATENTS OR APPLICATIONS

| 1,922,232 | 11/1969 | Germany | 65/172 |
|---|---|---|---|

Primary Examiner—Robert L. Lindsay, Jr.
Attorney, Agent, or Firm—John E. Curley

[57] ABSTRACT

A bushing block screen and bushing assembly is described which involves the positioning of a flow block, a bushing block and a glass fiber bushing adapted to produce glass fibers at the bottom thereof in the floor of a glass furnace forehearth. The bushing block is provided with a screen covering the surface area of an internal canal provided in the bushing block. The bushing block canal communicates with a similar canal of similar dimension positioned in the flow block and the top of a fiber glass bushing. The screen is positioned near the bottom of the bushing block and the bushing block canal is lined with precious metal, preferably platinum, or a platinum alloy and is further provided with a platinum flange at the top and the bottom thereof where the bushing block contacts the flow block and the bushing respectively.

6 Claims, 3 Drawing Figures

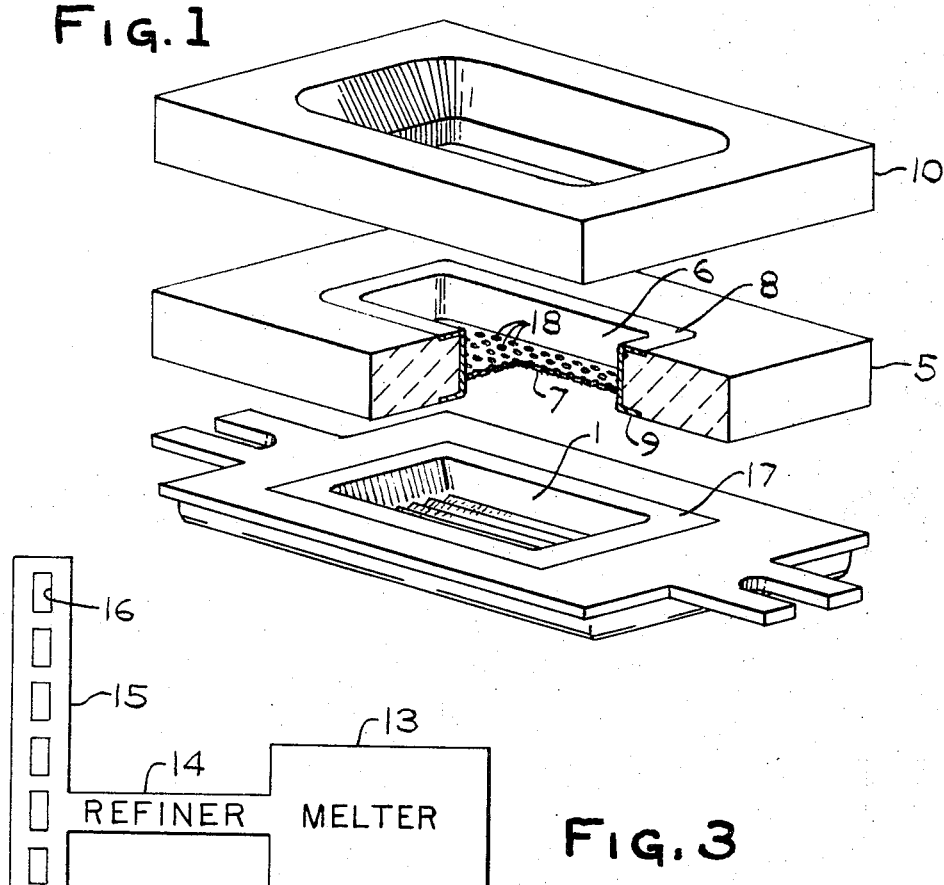
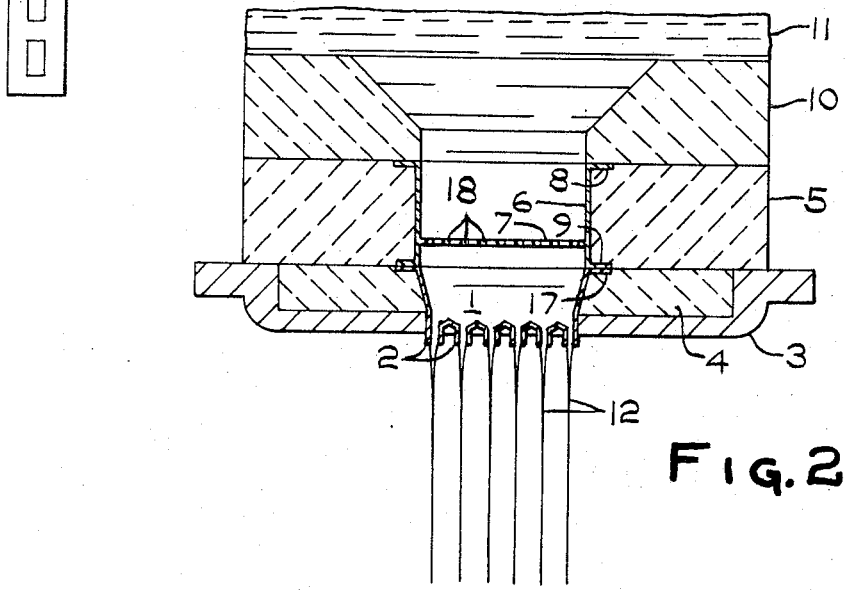

BUSHING BLOCK ASSEMBLY AND SCREEN

BACKGROUND OF THE INVENTION

In the manufacture of glass fibers, fibers are typically formed by passing molten glass through a platinum bushing which consists of a platinum container having located at the bottom thereof a plurality of platinum containing orifice tips or orifices through which the molten glass flows to form the glass fibers. The tips and orifices are sized to produce fibers of a given diameter, typically from 0.000 to 0.002 inch. Fibers emanating from the bushing orifices or orifice tips are then typically wound at high speeds on a rotating mandrel or collet after the fibers have been suitably sized and gathered into strand. In the manufacture of glass fiber insulation materials, frequently the glass fibers emanating from the bushing are drawn downwardly into the face of a flame which intersects the fibers and attenuates them into short, staple lengths, usually of very fine diameter and these staple fibers are collected on a collecting surface, treated with an appropriate binder and formed into mats or bats of glass fiber insulating material. The bushing through which the fibers are drawn is normally located on the underside of a forehearth which is connected to a glass melting zone or furnace.

In a typical direct melt operation, a suitable glass batch is fed to a large melting tank which is provided with a melting zone and a refining zone. The glass is melted by the application of a suitable heat source to the glass batch entering the melting tank and after passage through the refiner, the melted glass is usually fed to a forehearth, which is an elongated refractory lined zone connected to the furnace and supplied with suitable heat sources to maintain the glass in a molten condition. The forehearth is provided with a plurality of apertures at the bottom thereof for the reception of the fiber glass bushing assembly units that are to be connected to the bottom forehearth. Thus, for a single glass melting furnace, a plurality of bushings are fed with the molten glass realized from that melting source.

During the operation of a fiber glass bushing, it is necessary periodically to shut down a bushing for a bushing change. These changes occur for many reasons. For example, erosion of bushing tips may occur to the extent that fibers of the desired diameter can no longer be drawn from the bushing. A leak may have developed in a bushing, or an electrical lead utilized to supply electrical energy to the fiber glass bushing may become inoperative, thus, necessitating this shutdown. In the normal procedure for making a bushing change on an operating forehearth, the operators typically flood the external surface of the bushing with massive amounts of a cold fluid, usually water. These massive amounts of water are utilized to extract heat from the bushing and the bushing block area to freeze or solidify the molten glass contained in the central canals of both of these units so that the bushing itself can be removed from the bushing block while the glass contained in the central canal of the bushing block remains in a solidified state. As will be readily appreciated by those skilled in the art, with fiber glass bushings operating in the neighborhood of 1,800°F. to 2,600°F., considerable water must be introduced into this area in order to accomplish the freezing of the glass in the bushing and the bushing blocks. The forehearth itself can be emptied rather rapidly once the bushing has been removed if the glass remaining in the bushing block and the flow block located above it is still in a molten condition. The canals in the bushing block and flow block are typically canals 1½ inch to 2 inches in width and 12 to 18 inches in length having an overall depth through the flow block and bushing block of about 4 to 6 inches.

While normally an experienced operator has no difficulty in achieving satisfactory cooling of the bushing itself, to accomplish the freezing in the bushing block area, it has been found that the thermal shock to the forehearth area where the bushing is being replaced is such that the adjacent bushings are often affected. Thus, such large quantities of heat are so rapidly removed from the forehearth area around the bushing being replaced that considerable quantities of heat are extracted from adjacent bushings causing considerable amounts of out of specification materials to be produced from adjacent bushings. These out of specification materials are typically out of specification because temperatures have changed in the glass being fed to the bushings. A significant withdrawal of heat in the area of fiber formation has occurred as well as serious interruptions in the bushing environment on the underside of the adjacent bushings. Environment changes are caused by the evolution of steam when the bushing being changed has been flooded with the large quantities of water necessary to freeze the glass in the associated bushing block.

THE INVENTION

In accordance with the instant invention, considerable improvement is realized in bushing changeovers in that a bushing can be changed more rapidly than has been experienced in the past due to the repositioning of the screen from the bushing area to the bushing block area. In addition, the enormous quantities of water previously employed can be considerably reduced thereby reducing the contamination of environment in the area of the adjacent bushings. Further, the thermal shock to the forehearth area normally experienced and its effect on adjacent bushings during a bushing changeover is substantially reduced.

Thus, in accordance with the present invention, a bushing assembly is provided which involves the utilization of a flow block connected to the forehearth of a glass melting source, a bushing block which contains a platinum containing liner, flanged at the top and the bottom and provided with a screen located near the bottom thereof and a normal fiber glass bushing firmly affixed to the bushing block and located below the bushing block, with all three units i.e. the flow block, the bushing block and the bushing itself, being firmly attached one to the other so that no glass leakage can occur between the adjacent units during the flow of glass from the forehearth to the bushing tips associated with the fiber glass bushing.

For a more complete understanding of the present invention, reference is made to the accompanying drawing in which:

FIG. 1 is an exploded view in perspective of the bushing assembly of the instant invention;

FIG. 2 is a cross section of the bushing assembly of the instant invention showing the various parts of the bushing assembly joined to a forehearth; and FIG. 3 is a schematic diagram of a glass melting source, a refiner and an associated forehearth provided with apertures for the insertion of the bushing unit of the instant invention.

Turning to FIGS. 1 and 2, there is shown the bushing assembly of the instant invention. The bushing assembly comprises a flow block 10, a bushing block 5 and a bushing 1. The flow block is a generally rectangular, shaped mass of ceramic material such as zirconium block or other suitable refractory which can be cast into a single piece or it can be composed of a plurality of pieces of ceramic material fitted together to form the general shape shown by the flow block 10. For illustrative purposes, a single piece is shown in the drawing. The flow block 10 is designed to serve as part of a floor of a forehearth and in an assembled unit such as shown in FIG. 2 this flow block would be surrounded by other ceramic blocks forming the remainder of the floor of the forehearth.

The upper portion of the flow block 10 is beveled to provide a slight incline to the center section or central canal, which is shown in the drawing as an elongated, rectangular shaped hole which mates with a similar canal located in the bushing block 5 positioned immediately below it. The bushing block 5 is a ceramic block or a plurality of ceramic blocks joined together to form a bushing block having the general configuration shown in the unit 5 and having a central, generally rectangular shaped, aperture or canal in the center portion of the block. Positioned in the central canal of the bushing block 5 is a screen member 7 provided with a plurality of openings 18 through which the glass must flow in its passage from the forehearth of a glass melting source to the glass fiber bushing. Thus, glass proceeds from a forehearth through the flow block 10, the bushing block 5 to the bushing 1 located below the bushing block 5. This passage of glass through the bushing block 5 requires the glass to flow through this screen member 7 and the screen impedes the flow of glass since the molten glass must flow through a plurality of rather small openings in order to gain admission to the bushing 1.

Bushing 1 is attached to the underside of the bushing block 5 and is also provided on its upper surface with a flange member 17 preferably composed of a noble metal such as platinum or a platinum containing alloy, for example, a platinum - rhodium alloy. The flange 17 mates with a similar flange 9 also fashioned of a noble metal, preferably platinum or a platinum - rhodium alloy, located on the underside of the bushing block 5. The bushing 2 shown is of conventional design and is provided with a central opening that mates with the central opening of the bushing block 5. The bottom of the bushing 2 is provided with a plurality of orifices 2 through which glass flows and is attenuated into fibers 12. The bushing 1 is surrounded by a ceramic block or cast ceramic 4 which is held in place by a bushing frame 3.

As shown in FIG. 3, the overall glass melting system involves a glass melter 13 which can be conventional gas fired glass furnace, an oil fired furnace or an electric melter which is provided at its exit end with a refining section 14 through which the molten glass from the melter flows on its way to the forehearth 15. The forehearth 15 is shown as a generally elongated member having essentially two sections or arms extending at right angles to the refiner 14 and provided with a plurality of apertures 16 in which the bushing unit shown in FIGS. 1 and 2 are clamped on the underside thereof. Thus, the single melting tank 13 as shown in the drawing is capable of supplying nine bushings. This selection of forehearth shape and number of bushings is for illustrative purposes only; it being understood that the forehearth arrangement can be altered without any departure from the instant invention. Thus, forehearths having an H-shape can be employed. In like manner, considerably more bushing apertures 16 can be provided in any forehearth arrangement.

When a bushing 1 of the character shown in FIG. 2 is operating on a forehearth 15, such as shown in FIG. 3 and a change of that bushing is necessitated due to sagging of the bushing, the enlargement of the bushing orifices 2, a leak developing in a bushing or other similar operational difficulties, the changeover is accomplished in general as follows. Bushing 1 is generally operated at a controlled temperature by the application of suitable electric current to the platinum bushing itself. The electrical system associated with bushing 1 is not shown in the drawing since this is a conventional method of heating platinum bushings utilized by industry in the manufacture of fiber glass. The electrical current is cut off to the bushing 1 during a changeover and the temperature of the bushing is allowed to drop. After the current has been cut off from the bushing, the bushing is flooded with a cooling fluid, typically water, by spraying the water in large quantities onto the surface of the bushing to rapidly chill it and solidify or freeze the glass contained in the interior of the bushing 1 as rapidly as possible. In the instant arrangement, this solidification of the molten glass occurs more rapidly than has been conventional in the art since a very small quantity of glass is contained in the bushing block 5 located directly above the bushing and below the screen member 7. It is to be noted that the flange 17 of the bushing 1 and the flange 9 of the bushing block 5, respectively, mate with each other. The screen 7 is also joined to the liner 6 of which flange 9 is an integral part. Thus, there is a direct heat transfer relationship established between the surface of the bushing 1 and the liner 6 located in the bushing block 5 and the screen 7 contained therein. Thus, heat is rapidly transferred from the surface of the bushing 1 to the bushing block liner 6 and the associated screen assembly 7.

Rapid freezing of the glass in both the bushing 1 and the bushing block 5, especially below the screen 7, takes place. Glass located above the screen because it must pass through the openings 18 in the screen 7, tends to flow in a very slow manner and is rapidly trapped above the screen 7 and is frozen in place without the necessity of freezing glass all the way up through the flow block 10. In this fashion less cooling is required to make a bushing change and adjacent bushings do not have the quantities of heat removed from them as experienced in the past. Once this has been frozen below the screen 7, the bushing can be removed and replaced rapidly. With the bushing 1 removed, glass can be contained in the bushing block 5 by applying cooling fluid, water or air to merely maintain the solidified glass therein. Once the bushing 1 is replaced, heat can then be turned on by activating the electrical leads on the new bushing and the glass frozen in the bushing block is once again released and operation can continue.

It is found that in utilizing the bushing assembly of the instant invention, bushing changeovers can be accomplished quickly and efficiently with considerably less heat removal occurring from bushings that are adjacent to the bushing being changed than is experienced in a conventional bushing block which contains no screen.

Thus, in a conventional bushing assembly where the screen member is positioned in the bushing 1 rather than the bushing block 5, a bushing changeover typically taking one to two hours to accomplish can be made now in a relatively short time, 5 to 30 minutes, by employing the screen in the bushing block 5 rather than in the bushing 1. In addition, once the bushing 1 has been removed, the bushing block 5 and the glass associated therewith can be cooled utilizing air on the surface of the screen 7 rather than water after the bushing has been removed and before a new bushing has been set in place. This reduces considerably the amount of contamination occurring in the environment around adjacent bushings.

While the invention has been described with reference to certain specific examples and illustrated embodiments, it is not intended to be limited thereby except insofar as appears in the accompanying claims.

I claim:

1. A bushing assembly for receiving molten glass to be attenuated into glass fibers comprising a flow block having a canal for receiving molten glass from a forehearth, a bushing block having a central canal positioned below said flow block and affixed thereto, so that glass flows from the canal in the flow block to the bushing block canal, a platinum containing liner covering the walls of the bushing block canal and terminating in an upper and lower flange, said flanges covering a portion of the top and a portion of the bottom of said bushing block respectively, a platinum containing screen positioned across the lower portion of said bushing block canal and arranged so that glass contained in the bushing block canal must pass through said screen before it exits the bottom of said bushing block, an insulated platinum containing bushing affixed to the bottom of said bushing block, a plurality of platinum orifices provided at the bottom of said bushing and through which molten glass will flow, a platinum flange at the top of said bushing, insulation surrounding said bushing and means to hold the bushing onto the lower side of said bushing block.

2. A bushing block for placement above a glass fiber forming bushing comprising a generally rectangular, insulated block member having a rectangular central canal throughout the depth thereof, a platinum containing liner covering the walls of said canal, an upper platinum containing flange covering at least a portion of the top of said bushing block, a platinum containing flange covering a portion of the bottom of said bushing block, a platinum containing screen positioned across the lower portion of said bushing block and in said canal so that glass must pass therethrough to reach the bottom of said bushing block, said screen being located substantially below the top of said bushing block and slightly above the bottom thereof, and means to receive a bushing at the bottom of said bushing block.

3. The apparatus of claim 1 wherein said liner flanges and bushing are constructed of a platinum - rhodium alloy.

4. The apparatus of claim 2 wherein the bushing block liner is a platinum - rhodium alloy wherein said flanges are a platinum - rhodium alloy and said screen is a platinum - rhodium alloy.

5. The apparatus of claim 1 wherein said platinum - rhodium alloy is 80 percent platinum and 20 percent rhodium.

6. The apparatus of claim 2 wherein the platinum containing liners, flanges and screen are a platinum - rhodium alloy having 80 percent platinum and 20 percent rhodium.

* * * * *